United States Patent [19]
Greenberg

[11] 3,908,081
[45] Sept. 23, 1975

[54] APPARATUS FOR CONVERTING GRAPH DATA INTO A FORM SUITABLE FOR COMPUTER PROCESSING

[75] Inventor: Earl Greenberg, Whitestone, N.Y.

[73] Assignee: Efficient Instruments Corporation, Long Island City, N.Y.

[22] Filed: Feb. 3, 1972

[21] Appl. No.: 223,111

[52] U.S. Cl. ...... 178/6.8; 178/DIG. 36; 235/61.6 A
[51] Int. Cl. ...... H04n 7/18
[58] Field of Search ...... 178/5, 6, 6.8, DIG. 3, 178/DIG. 36, 7.85; 179/15.55 R; 235/61.6 A, 92 T

[56] References Cited

UNITED STATES PATENTS

| | | | |
|---|---|---|---|
| 2,798,605 | 7/1957 | Richards | 178/DIG. 37 |
| 3,347,981 | 10/1967 | Kagan et al. | 178/6 |
| 3,558,811 | 1/1971 | Montevecchio et al. | 178/6 |
| 3,584,143 | 6/1971 | Gold | 179/15.55 R |
| 3,598,963 | 8/1971 | Osugi et al. | 178/DIG. 36 |
| 3,603,729 | 9/1971 | Sperben | 178/6.8 |
| 3,621,130 | 11/1971 | Paine et al. | 178/6.8 |
| 3,644,714 | 2/1972 | Phillips et al. | 178/DIG. 36 |
| 3,693,042 | 9/1972 | Fredkin et al. | 178/7.85 |
| 3,716,700 | 2/1973 | Kelch et al. | 235/61.6 A |

*Primary Examiner*—Robert L. Griffin
*Assistant Examiner*—Michael A. Masinick
*Attorney, Agent, or Firm*—Michael S. Striker

[57] ABSTRACT

A tachograph digital conversion apparatus converts the markings from a chart into suitable form for analysis by a computer. The apparatus utilizes a television camera for scanning successive sectors of the chart with a scanning beam. The composite signal from the television camera contains video, scanning and frame information. The composite signal has a horizontal pulse output at the beginning of each scan and a vertical pulse output at the beginning of each frame. The apparatus includes detectors for counting and detecting the number of scans and the number of frames through which the beam has scanned the chart. When the beam encounters a marking on the chart, this fact together with the information concerning the position of the scanning beam at the time of such encounter is encoded into suitable binary form for processing by a digital computer. The encoded information is then transmitted to a computer for analysis. To increase the resolution, a portion of the chart is magnified and the television camera scans the magnified image of the chart. Also, the chart is scanned by the television camera and information is only extracted following a predetermined time period after which the image of the chart has formed sharply on the television vidicon tube. The resolution and accuracy of the converting apparatus is further increased by dividing that portion of the magnified chart image which is being examined into a predetermined number of steps. By continuously counting and monitoring the step count, scan count and frame count, the positions of the markings can be easily determined. The information concerning the position of the scanning beam, together with the information concerning the presence of a marking, is converted into binary code and transmitted to a computer interface. The interface circuit responds to a ready condition of the computer, and transmits the binary coded information to the computer for analysis.

45 Claims, 3 Drawing Figures

APPARATUS FOR CONVERTING GRAPH DATA INTO A FORM SUITABLE FOR COMPUTER PROCESSING

BACKGROUND OF THE INVENTION

Tachograph charts are well known in the art. On these are recordings on which speed, distance travelled, time travelled and other parameters of interest may be plotted as a function of time. Commonly used with moving vehicles, most usually large trucks, these charts provide a simple and inexpensive way of continuously monitoring the performance of the truck and/or the driver.

However, the analysis of such charts has, to date, been difficult to achieve automatically. For this reason, the charts are not always analyzed, even after being made except in special instances, such as the occurrence of an accident. Because the analysis of charts has usually been performed manually, not only have such charts been infrequently analyzed, but those that have been analyzed have been at a great expense both in terms of the times as well as money.

Attempts at automatically analyzing charts has generally resulted in apparatus which has been extremely complex and difficult to use. Additionally, such automatic analysis equipment has also been generally very expensive and, consequently, such apparatus has not gained wide commercial acceptance.

Because automatic means for analyzing a chart has not hitherto been available in a simple and inexpensive commercial model, chart users have been unable to fully utilize the information contained thereon. Consequently, the inefficiencies in the use of the trucks and/or the drivers have not been brought to the attention of the users.

SUMMARY OF THE INVENTION:

Accordingly, it is an object of the present invention to provide an apparatus for converting markings derived from a graph which does not have the above disadvantages of the prior art.

It is another object of the present invention to provide an apparatus for converting markings derived from a graph which is simple in construction and inexpensive to manufacture and which converts the markings into suitable form for analysis by a computer.

It is still another object of the present invention to provide an apparatus for converting markings derived from a graph which is inexpensive to manufacture and which provides sufficient accuracy and resolution on the graph for most commercial purposes.

It is a further object of the present invention to provide an apparatus for converting markings derived from a graph which is inexpensive to manufacture and which utilizes a television camera for scanning the image of the graph, the information contained in the composite signal at the output of the television camera being processed to determine when a marking has occurred and determining the relative scanning beam position at the timing of such marking occurrence.

It is still a further object of the present invention to provide an apparatus converting markings derived from a graph which utilizes a television camera to scan the image of the graph, the information concerning the presence of absence of a marking as well as the information concerning the position of the scanning beam when such marking occurs is converted into a binary digital form suitable for processing by a digital computer.

It is yet a further object of the present invention to provide an apparatus for converting markings derived from a graph which is inexpensive to manufacture and which utilizes a television camera for scanning successive portions of a graph with a scanning beam, the information available at the output of the television camera not being processed until after a predetermined time period when such portion has formed a sharp image on the vidicon tube of the television camera.

It is yet another object of the present invention to provide an apparatus for converting markings derived from the graph which is inexpensive to manufacture and which utilizes a television camera for scanning at least a portion of the graph with a scanning beam, each scan of the scanning beam being further broken down into a predetermined number of counts, the count number when a marking appears to be transmitted to the computer in order to increase the resolution of the apparatus.

According to the present invention, an apparatus for converting markings derived from a graph, particularly a tachograph chart, into suitable form for analysis by a computer has scanning means for scanning successive areas of at least a portion of said graph with a scanning beam. First generating means are provided for generating a first signal when said scanning beam encounters a marking on the area being scanned. Second generating means are provided for generating a second signal corresponding to the position of said scanning beam each time said beam encounters a marking on the area being scanned. Finally, transmitting means are provided for transmitting information represented by said first and second signals to a computer for analysis.

According to presently preferred embodiment, the apparatus for converting markings converts the markings from a chart. The scanning means comprises a television camera which is focused at least on a portion of the chart, the camera having a composite electrical signal output which includes information regarding the instantaneous position of said scanning beam and also includes video information regarding the presence and the absence of markings on said portion. The chart is mounted on a turntable and is rotated in predetermined angular steps at which time the turntable is stopped. Sufficient time, depending on the television camera used, is provided in order to insure that the tachograph forms a sharp image on the vidicon tube of the television camera in order to increase the resolution. A lens, between the turntable and the television camera, is utilized to magnify the portion of the graph which is being analyzed. The television camera scans the magnified image of the portion of the chart, thus increasing the resolution of the system. The television camera has a composite signal output which contains video information regarding the presence or the absence of the tachograph markings as well as scanning beam position information in the form of horizontal scanning pulses and vertical frame pulses. The horizontal as well as vertical pulse information is then coded into binary digital form. Each beam scan is further broken down into a predetermined number of steps or counts. When a marking on the chart appears, the count number as well as the scan and frame numbers, after being encoded into a binary digital form, are transmitted into a computer interface circuit which stores, and at appropriate times, transmits the information to the computer for processing and analysis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT:

The Tachograph Chart

Figure 1:
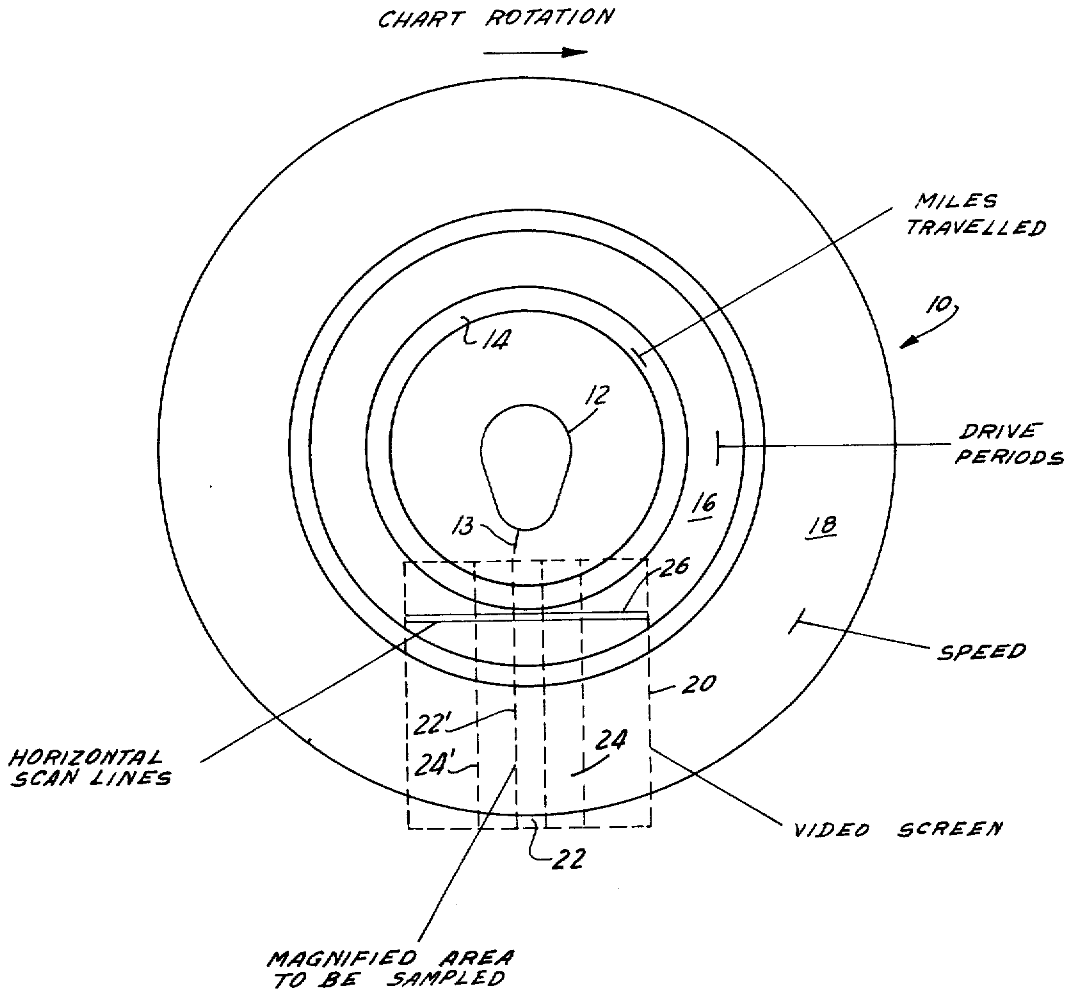
FIG. 1 is a schematic view of a tachograph chart of the type which can be analyzed by the apparatus according to the present invention, showing the approximate size of the vidicon screen of the television camera which encompasses the co-extensive portion of the chart.

First examining FIG. 1, there is shown a tachograph chart 10 which is in the shape of a flat disk, not unlike a phonograph record. However, the chart may be made from any material on which markings may be inscribed. Thus, the chart 10 can consist of, for example, a paper disk on which the markings have been inscribed in ink. Most commonly, however, these charts are made from a thin, paper or metallic chart of one color which is coated with wax or plastic of a sharply contrasting color. In use, a sharp pointer is utilized to scratch the coating to thereby uncover the sharply contrasting color of the disk. However, the particular nature of the chart is not critical for the purposes of the present invention, it only being necessary that the markings be visibly perceivable against the background of the chart. The higher the contrast between the markings and the background, the more sensitive and accurate will the converting apparatus be.

The chart 10 is shown to have an opening or hole 12 at its center. The hole 12 is irregularly shaped and is utilized, in a similar fashion as with a phonograph record, to mount a chart on a turntable for rotation. Although charts come in different shapes and sizes, depending on the particular use, charts are commonly of the 24 hours variety. The 24 hour chart is generally utilized to monitor the performance of equipment, more particularly of a truck or driver thereof, for a 24 hour period. In its mounted condition, the chart typically rotates about the center hole 12 at a substantially constant rate, whereby the entire chart rotates a complete revolution in 24 hours. During this time, the pointer, or pointers, have inscribed scratches onto the surface of the coating in order to generate markings on the chart. In order to properly reference the starting time of the tachograph, it is possible, for example, to utilize the shape of the hole 12 so that the hole 12 is positioned in a certain manner corresponding to zero hours, chart time. It is also possible to place a marking 13 of the chart, which can be manually or automatically sensed so that the chart can be placed into a suitable initial condition. The importance of this initial positioning will be explained hereafter.

Depending on the number of parameters which are recorded on the chart, one or more pointers may be utilized to scratch one or more curves or markings on the surface of the chart 10. Also, each parameter can be assigned a predetermined space on the chart in which the markings may occur. Thus, the miles travelled ring 14 is shown to occupy a relatively small radial space. Similarly, the travelling time ring 16 is relatively small, for reasons to be explained hereafter. On the other hand, the speed ring 18 is shown to be relatively large. The speed or velocity of a vehicle, particularly a truck is of particular importance and for this reason the space alotted to it is relatively large in order to improve the accuracy of the readings. The distance travelled as well as travelling time are also read in each frame, as will be described, although such information could be derived from the speed data alone. Although the distance travelled sector is relatively small, it is adequate to give good accuracy for most commercial purposes. Travelling time is no problem since this can usually be shown as an off-on indication. Although not shown, RPM as well as other parameters can, of course, be read in the same way as speed.

Still, referring to FIG. 1, shown superimposed over the chart 10 is a vidicon screen area 20 which represents the viewing or scanning area of the television camera used for scanning the chart, as shall be described hereafter. However, in order to increase the resolution of the conversion system, only a small sector 22 is examined at any one particular time. To achieve the improved resolution, a magnification system is interposed between the tachograph 10 and a television camera, to be described, wherein the sector or portion 22 is magnified into a sector 24. According to the presently preferred embodiment, magnification is only applied in one direction, namely in a direction to widen the sector 22. By expanding the portion 22 as shown, the resolution of the corresponding chart time is increased.

The modified sector 24 is not necessarily drawn to scale in relation to the dimensions of the sector 22. The improvement in resolution as a result of magnification must be weighed against undue distortion by the magnification system. However, magnification in the radial direction is not necessary for reasons that will be hereafter explained. To insure that only the data within the sector 24 is examined, the scan lines 26 are only effective when scanning over said sector 24, in a manner which will be described hereafter. Once the sector is magnified, however, the scan lines 26 become effective once they have moved from the left towards the right at the time when they reach the left boundary 24′, the magnified position of the actual boundary line 22′.

Start Circuitry and Turntable

Figure 2:
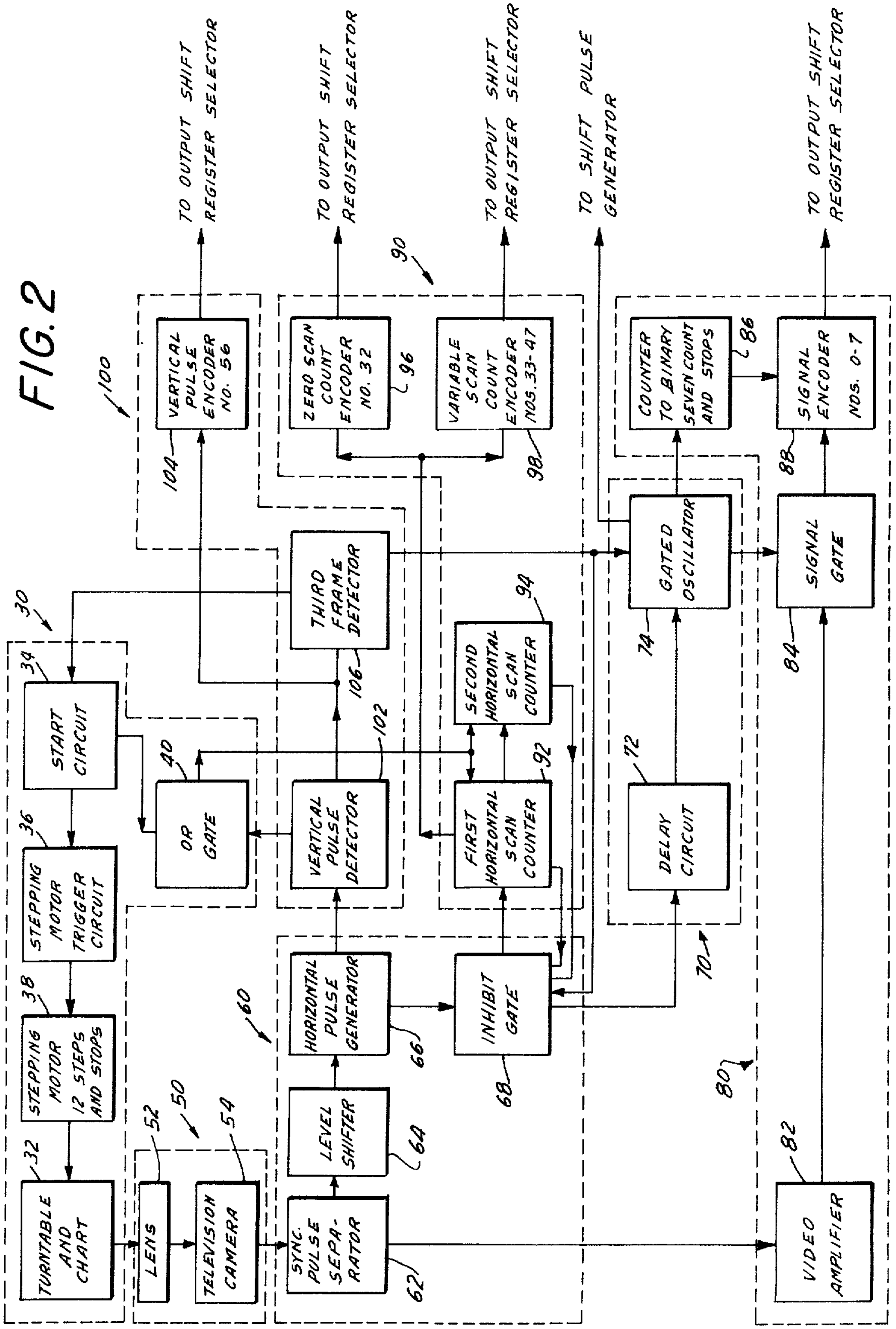
FIG. 2 is a block diagram of the apparatus for converting markings derived from a graph into a binary digital form suitable for processing by a binary computer.

Referring now to FIG. 2, the start circuitry and turntable is generally designated by the reference numeral 30. A turntable 32 is provided which is adapted to mount the chart 10 and rotate it in a manner to be described.

A start circuit 34 is provided which is utilized to initiate the operation of the system. Start circuit 34 is connected to a stepping motor trigger circuit 36, the stepping motor trigger circuit 36, in response to the start circuit 34, generates a series of twelve pulses in succession and then stops. Connected to the stepping motor trigger circuit 36 is a stepping motor 38 which responds to each of the twelve pulses generated. Each pulse steps the motor 0.15°. The turntable 32 is connected to the stepping motor 38 to share the rotational movement thereof, so that initiation of the apparatus causes the turntable and the chart 32 to rotate a total of 1.8°. Once the turntable and chart 32 have rotated 1.8°, they come to a stop and are in a position to be examined by the photoelectronic sensor as will be described.

It is clear that with the presently preferred embodiment, there will be 200 such positions during the course of one full revolution of the chart. Since the chart, when originally being made, is rotated at a substantially constant velocity, angular distance on the chart is proportional to the chart marking time, or as it will subsequently be referred to as chart time. If a 24 hour chart is utilized, then 1.8° represents 7.2 minutes of chart time. Referring to FIG. 1, the 7.2 minutes of chart time is substantially included in the sector 22 on the chart, as magnified into sector 24. The 7.2 minutes represented by the sector 22 is not unique but merely illustrative. Likewise, the fashion in which the turntable and the chart are rotated in 0.15° steps for a total of 1.8° is not in itself critical to the present invention. This manner of operation has merely been chosen because of convenient gearing ratios. In fact, it would be preferable if the turntable and chart 32 could be rotated in a single step, since this would decrease the time during which the entire chart is read. Factors in selecting the chart time represented by the sector 22 will be described hereafter.

The present invention is not limited to the reading of charts, since, as explained above, any graph which contains optically perceivable markings can be analyzed as will become clear hereafter. Because of this, and since the data may have been entered on such graph in linear direction instead of a circular direction as with a chart, instead of a turntable, a device for linearly advancing the graph along the direction of the markings as they were recorded can be used. Thus, the purpose of the start circuitry is to advance a graph bearing markings in a proper sequence, the motion of the graph being to correspond with the sequence and direction in which the markings were originally inscribed on the graph.

The start circuit 34 is connected to the OR gate 40 which can be initiated by the start circuit 34 or electronically, as will be described. When activated, the OR gate is utilized to clear or to reset the first and second horizontal scan counters, as will be described. The start circuit 34 can further include means for rotating the graph until zero hour chart time of the graph is coincident with the left boundary 22'. This can be accomplished, for example, by inscribing on the chart a zero hour line 13 as shown in FIG. 1. Once the chart has been rotated adequately to bring the line 13 in the appropriate starting position, the start circuit, sensing this by conventional means stops rotating the chart 10 until it is again electronically activated.

Photo-electronic Sensor

Positioned aproximately to the turntable and chart 32 is a sensor or transducer 50. The purpose of the sensor 50 is to detect the presence or the absence of markings on the chart 10 and convert this information into signals which can be operated on or processed by a system that follows. Although the present invention will be described as utilizing an electronic system, this is not critical and a mechanical, hydraulic or other systems can be utilized in an analogous way as the electronic system is utilized.

The principal utilized in the present invention is that the chart or graph to be analyzed is scanned by a scanning beam, a mechanical feeler or other scanner, said scanner being capable of detecting the presence or absence of a marking on the chart or portion thereof. The position of the scanner is monitored and when a marking is encountered by the scanner, its location or coordinates are known from knowing the position of the scanner. Depending on the processing apparatus used, the information concerning the presence or the absence of a marking, as well as the information containing the position of the scanner can instantaneously be transmitted to a computer for analysis, or the information can first be stored in a predetermined manner and transmitted to the computer in steps. The computer, knowing the coordinates of the markings can reconstruct the entire curve as well as make various calculations therewith to obtain desired information.

The sensor 50 utilized in the presently preferred embodiment consists of a lens 52 and a television camera 54. The lens 52 is interposed between the turntable 32 and the television camera 54. The purpose of the lens 52 is to enlarge a portion of the tachograph 10, preferably that sector 22 which is being analyzed. The lens 52 must be selected to appropriately magnify the portion of the graph which is of interest. In the present case, since the sector 22 is an elongated sector and since chart time increased in a direction transversely to said sector 22, the sector 22 is magnified in the transverse direction by the lens 52 to render a magnified sector 24. In general, the only useful magnification is that in the direction of changing chart time. It will be appreciated that the greater the chart time the tachograph represents, the more cluttered are the markings with respect to each other. This reduces the resolution of the system. By magnifying the tachograph in the direction of the changing chart time, the markings are somewhat separated from one another and the resolution is increased.

In the presently preferred embodiment, the sector 22 is magnified only in the horizontal direction by an optical system of two cylinder lenses or lenses that magnify by the C lens of the camera itself. The fine vertical lines, for instance, indicating acceleration on the vehicle, are widened 5 to 10 times, depending on the horizontal magnification. Such lines are now readily discernable by the camera and the corresponding output voltage pulses are well above the noise level.

The television camera 54 is focussed on the magnified image 24 of the chart. This image is focussed projected and on the screen of the vidicon tube. This image is scanned rectilinearly by an electron beam in a well known way. While the television camera 54 continuously scans the vidicon screen, representing an area 20 in FIG. 1, information transmitted by the television camera 54 will only be utilized at the selected times as will be described.

Generally, any standard television camera can be utilized for the purpose of the present invention. However, depending on the nature of the electrical output of the composite signal, the signal conditioning prior to analysis may be somewhat different than that to be described. Otherwise most commercially available television cameras operate in substantially the same manner. However, the quality of television cameras varies substantially. As will become clear, the present system makes it possible to utilize a less sophisticated camera to obtain the desired accuracies. Good quality television cameras generally have vidicon tubes which can form a sharp image of the object focussed upon in a relatively short time. In a similar manner, the retention of the vidicon tube is short so that when the object focussed upon is moved or replaced by another object, the vidicon screen can rapidly form a sharp image of the second situation. In less sophisticated cameras, the retention of the vidicon screen is generally higher and in order to form a sharp image on the vidicon tube it is necessary to focus the camera on the object and maintain the object in a stationary position relative thereto for a predetermined time depending on the vidicon tube used. The present invention includes features, to be described, which make it possible to use less sophisticated television cameras which have higher retention vidicon tubes. Also, the television camera can be of the random scan type, it not being necessary that the scan lines always repeat themselves in subsequent frames. Referring to FIG. 1, the effective vidicon screen area is designated by the reference numeral 20. As explained above, when no magnification is utilized, the sector 22 appears on the vidicon screen as shown. However, when the magnification is utilized the effective vidicon screen area remains the same but the image of the sector 22, or the magnified sector 24 appears on the vidicon screen.

The electron beam is scanned horizontally with a scanning beam which moves along scanning lines 26 from left to right. Although this varies from camera to camera, the electron beam in the camera 54 in the presently preferred embodiment, scans horizontally across the vidicon screen area 20 in approximately 70 microseconds. The scanning starts at the top of the screen and proceeds vertically towards the bottom. In the course of scanning from the top to the bottom of the vidicon screen area 20, the scanning beam traverses approximateley 240 horizontal scans. One full set of horizontal scans from the top to the bottom of the vidicon screen defines one complete frame. As to be described, the television camera may actually include a somewhat greater number of horizontal scans which are, however, outside of the vidicon screen area 20. As will be described, additional horizontal scans which are not included within the area 20 or which are included but provide only distorted information, are not utilized. Based on 70 microseconds per horizontal scan and 240 horizontal scans per frame, it is readily calculated that the time it takes the television camera to scan one entire frame is approximatelly one-sixtieth of a second. Since there are 200 sectors 22 of 1.8° each, it would take approximately 3.3 seconds to scan all the sectors 22 at least once, not including the stepping or revolving time of the turntable 32. However, in the presently preferred embodiment, the turntable and chart 32 are maintained in the stop position for three entire frames of the television camera in order to insure that a sharp image has formed on the vidicon tube. This may be necessary, as explained above to permit the camera to sharply build up the scene or image of the object. Therefore, since it effectively takes three frames to read each sector 22, it takes approximately 10 seconds for actually scanning the tachograph, not counting the stepping time of the stepping motor 38 or the time it takes the chart and turntable 32 to successively advance adjacent sectors 22 into position for scanning. The time consumed for physically moving the turntable from one position to the next is not negligible when compared to the total scanning time. Although the total time for reading the chart may be suitable for presently intended purposes, this time can be reduced by selecting a better quality camera. By selecting a better vidicon tube, it would not be necessary to wait until every third frame to take the information from the sector 22, it becoming only necessary that each sector 22 be scanned once before the adjacent sector can be moved into place. This of course would reduce the scanning time by one-third. Additionally, if a television camera having higher resolution or a magnification system having less distortion is selected, then larger sectors 22 can be selected. It will be appreciated that the larger the sector 22 is, the fewer frames must be scanned.

The television camera 54 has an output composite signal, typical of most television cameras. The composite signals include vertical pulses which initiate each frame, horizontal pulses which initiate each horizontal scan and video signal voltages which represent the chart date in its electro-analog form. The vertical and horizontal pulses appear periodically, the vertical pulses generally being substantially wider than the horizontal pulses. The video information appears between the horizontal pulses. The horizontal and vertical pulses are referred to as synchronization pulses (or sync pulses) since they synchronize the operation of the television camera. Whenever the vidicon tube electron beam intersects any of the fine chart markings on the vidicon image of the chart, a negative voltage pulse appears in the video portion of the composite signal. Negative video pulses, between horizontal pulses, denoting the presence of a marking result in the presently preferred embodiment from the use of a chart of the type which has a light background, the contrasting markings being dark. Therefore, for scanning beam positions, when there are no markings there is effectively no output. However, where there is a marking, which may appear as a dark spot or line, a negative pulse appears. The horizontal and vertical pulses are likewise negative going pulses. As suggested above, the details concerning the composite signal are not critical for the present invention since the following circuitry can easily be modified to process a different composite signal.

Signal Conditioning

Signal conditioning is, broadly defined, accomplished by the circuitry generally designated by the reference numeral 60. The purpose of the signal conditioner 60 is generally to transform the composite signal coming from the television camera 54 into signals and voltage levels which are consistent with the nature of the circuitry utilized to perform another conversion that follows. Accordingly, a synchronization pulse separator 62 is connected to the television camera 54. Although such a circuit is optional, its function is to separate a composite signal into its components: (1) vertical pulses, (2) horizontal pulses, and (3) the video pulses. However, since the horizontal pulses, the vertical pulses and the video pulses occur sequentially and not simultaneously, and since actual sampling is only performed over a narrow portion of each scan, the various pulses can be detected without first being separated. Thus, the output of the synchronization pulse separator consists on the one hand of negative signal pulses which designate the presence of the markings on the chart 10 and vertical and horizontal pulses which designate the position of the scanning beam. A level shifter 64 is connected to the pulse separator 62 to shift the dc level required for the operation of the horizontal pulse generator 66 that follows. The level shifter 64 shifts the dc level of the composite signal, when no pulse separator 62 is utilized, or the dc level of the vertical and horizontal pulses which eminate from the pulse separator 62. The level shifter 64 shifts the input dc level to effectively eliminate the dc component at its input, feeding a voltage to the horizontal pulse generator 66 consisting of negative going pulses having a zero reference base voltage.

The horizontal pulse generator 66 effectively inverts the negative going horizontal and vertical pulses, maintaining the reference base voltage at zero. Thus, the output of the horizontal pulse generator 66 comprises a series of positive going pulses. The level shifter 64 and the horizontal pulse generator 66 are, as the pulse generator 62, optional, depending on the nature of the composite signal which is formed at the output of the television camera 54. The combined effect of the level shifter 64 and the horizontal pulse generator 66 is to convert the voltages at the output of the television camera 54 to voltages suitable for further processing, as to be described.

An inhibit gate 68 is connected to the horizontal pulse generator 66 for transmission of the horizontal pulses to following circuitry to be described. However, inhibit gate 68 can only transmit the horizontal pulses during the first 240 horizontal scans. After 240 scans, the inhibit gate 68 is inhibited, as to be described, since horizontal scans beyond 240 do not contain additional useful information, for reasons described above. Also, the inhibit gate 68 is inhibited from passing horizontal pulses except during every third frame, for reasons described above. Thus, only the first 240 horizontal pulses during every third frame are processed by the apparatus. If a more sophisticated television camera is utilized, and successive sectors 22 are scanned during successive frames, then the inhibit gate 68 can pass horizontal pulses during every frame. However, even with a more sophisticated camera, it may still be necessary to limit the number of horizontal pulses which are examined, since a small number of those pulses represent scanning lines which are beyond the area 20 encompassed by the vidicon screen.

System Timing

The system timing is generally designated by the reference numeral 70. In the presently preferred embodiment, a delay circuit 72 is connected to the inhibit gate 68. The delay circuit 72 may consist of any suitable configuration, which can be initiated by a pulse to generate a gate pulse having a predetermined width. The delay circuit 72 can be a monostable multivibrator which is started or initiated by each successive horizontal pulse, when such are transmitted by the inhibit gate 68. The width of the delayed or gate pulse at the output of the delay circuit 72 can be adjusted to suit the particular requirements. The delay circuit serves the function of delaying the time before which data is accumulated from the chart 10, namely preventing the accumulation of the data until the scanning lines 26 have reached the left boundary 24' of the magnified sector 24. Since approximately ten sectors are contained within each vidicon screen area 20, there might otherwise result overlapping of data. In this manner, the left boundaries 24' of successive magnified sectors 24 start in the same position so that the data contained on the chart is not duplicated. As stated above, the time period for each horizontal scan is approximately 70 microseconds. However, as will be further explained, each magnified sector 24 only represents approximately one-tenth of the total scanning time, or, in the presently preferred embodiment approximately 8 microseconds. Thus, assuming that the magnified sector 24 is symmetrically position within the vidicon screen area 20, the delay circuit 72 provides a delay of approximately 31 microseconds, at which time the scanning beam reaches the left boundary 22'. When sector 22' is magnified, the left boundary 24 moves to the left somewhat, and the time delay which the circuit 72 must provide is somewhat less.

A gated oscillator 74 is connected to the delay circuit 72. The gated oscillator 74, has a gated input which is controlled by the delay circuit 72. When the delay circuit is initiated, the gated pulse from the delay circuit 72 inhibits the gated oscillator 74 from oscillating. Only after the gating pulse disappears, at the end of the predetermined time delay, is the gated oscillator turned on. As will be described herafter, the gated oscillator has another input gate which is controlled to inhibit the gated oscillator from oscillating except during every third frame. Thus, the gated oscillator 74 only oscillates during every third frame, starting at a time when the scanning beam has reached the left boundary 24'. The gated oscillator oscillates at a frequency of 1 megahertz to generate 1 microsecond pulses at its output. The 1 microsecond pulses are utilized to synchronize the various circuits in the apparatus. Such oscillators are generally known as system clocks and are commonly utilized in digital circuits.

Marking Detector

The marking detector, generally designated by reference numeral 80, includes a video amplifier 82 which accepts the negative video pulses from the pulse separator 62, or from the television camera 54 directly if a pulse separator is not used. Although a video amplifier may not be necessary in certain instances, it will most usually be utilized in connection with less sophisticated television cameras to boost the level of the video pulses. The video amplifier 82 has a voltage gain of 100. A feedback loop is preferably employed to maintain the dc reference level on which the video pulses are superimposed. The output of the video amplifier 82, therefore, consists of a stabilized DC level on which are superimposed negative going pulses. The gain of the video amplifier is sufficient to amplify the video pulses to ensure that they can be operated on by the following circuitry.

Figure 3:
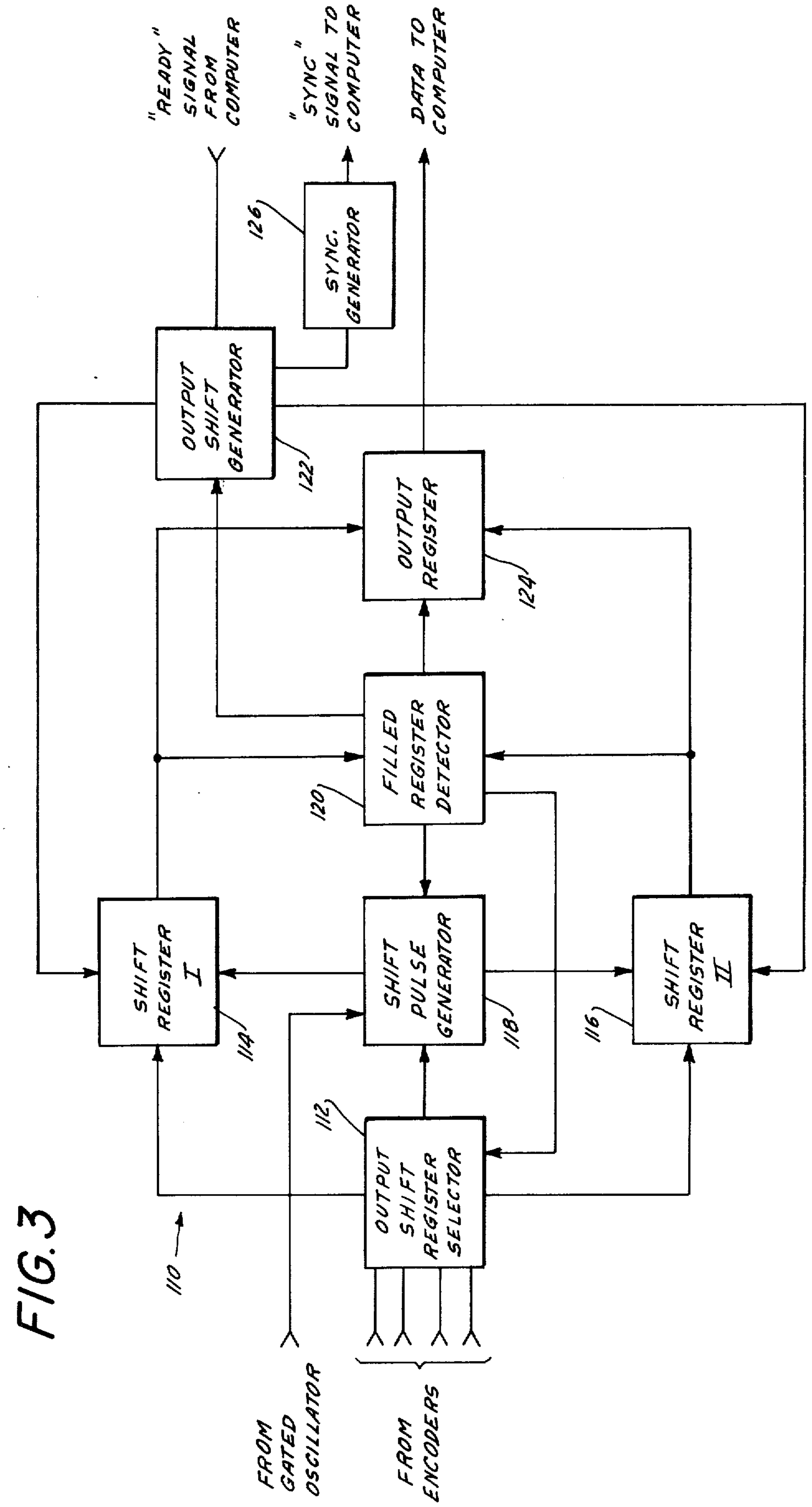
FIG. 3 is a block diagram of a computer interface circuit which is connected to the circuit of FIG. 2 and to a digital computer for storing and transferring the data stored in the computer interface to the computer.

A signal gate 84 is connected to the video amplifier 82. In its simplest form, the signal gate 84 can be connected directly to the television camera 54. Whenever a negative video pulse appeared at the output of the latter, the gate could be enabled to generate a pulse of the nature to be described. In this case, the output from the signal gate 84 could be encoded into an arbitrary binary digital word which can be transmitted to the output shift register selector (FIG. 3). The appearance of this encoded signal would signify that a marking had been encountered during a particular scan 26. However, the signal gate 84 according to the presently preferred embodiment has two inputs and one output, its input connected to the video amplifier comprising an enable gate input. The other input of the signal gate 84 is connected to the gated oscillator or clock 74. The output of the signal gate 84 consists of a pulse which is generated by the signal gate 84 only when a video pulse and a clock pulse appear simultaneously at the respective inputs to the signal gate. However, as mentioned above, clock pulses are generated only every third frame and only after the scanning beam reaches the left boundary 24'. Thus, a signal at the output of the signal gate 84 is only possible if a marking appears on the chart 10 to the right of the left boundary 24' every third frame. When a marking occurs to the right of the left boundary 24', the negative video pulse acts as an enable pulse, enabling the signal gate 84 to pass a respective clock pulse from the gated oscillator 74.

A counter 86 is also connected to the gated oscillator 74, the gated oscillator transmitting clock pulses to the counter when it is oscillating. The counter 86 counts the clock pulses 27 from zero to seven (binary counts, 000 to 111), for a total of eight counts, and then stops. This represents a count of 8 microseconds. Since the gated oscillator is turned on only after the scanning beam has reached the left boundary 24' during every third frame, a count of 8 microseconds represents a sector of approximately one-tenth of the 70 microsecond scanning line 26. The first count of the counter 86 coincides with the first pulse subsequent to the scanning beam reaching the left boundary 24'. The portion of the scanning beam when the eighth count is reached defines the right boundary 24''. After the eighth count, the counter 86 stops.

A signal encoder 88 is connected to both the signal gate 84 and the counter 86. The signal encoder 88 is designed to convert the counter number stored in the counter 86 into a suitable binary number, as will be described, only when a marking occurs within the magnified sector 24. The counter 86 effectively generates a window for the system which only permits an examination of the particular magnified sector 24 under consideration. Also, by dividing each magnified sector 24, which represents 7.2 minutes of chart time by eight, this divides the magnified sector into steps which are each equivalent to 54 seconds. By further counting down in this way, the resolution of the present system is approximately plus and minus ½ minute of chart time. This resolution by all accounts should be more than sufficient to discern all conceivable accelerations of the vehicle and to discriminate by computer techniques against stray markings on the chart. Thus, when a pulse appears at the output of the signal gate 84, signifying that a marking has been encountered by the scanning beam, the signal encoder 88 encodes the count existing in the counter 86 at the time that such marking was encountered. According to the present embodiment, the signal encoder encodes counts from 0 to 7 corresponding to counter 86 binary numbers 000 (0) to 111 (7). Thus, for example, should a marking occur about half way through the sampling sector while the binary count is 3 (011), this count is encoded by the signal encoder 88 into a corresponding 6 bit binary word which is to be transmitted to the output shift register selector, to be described. In this manner, the clock pulses emanating from the gated oscillator 74 convert the randomly arriving asynchronous pulses from the vidicon tube into synchronous signals for the proper timing of the system.

The encoded signals from the signal encoder 88 are transmitted to the output shift register selector as soon as a clock pulse appears at the output of the signal gate 84. The count encoded signal from the signal encoder 88 as well as other encoded signals to be described, are transmitted to the output shift register selector sequentially in time. The purpose of transmitting the encoded information sequentially in time will be described hereafter.

Because rectangular sectors 22 are scanned instead of wedged sectors, there will be some error if the scan lines 26 at the top and at the bottom are each divided into 8 counts. Obviously, for equal chart time, an arc toward the center of the tachograph 10 is shorter than a corresponding arc towards the periphery of the tachograph. To correct for this, the counts of 1 to 8 can be weighed as a function of the horizontal scan line number. Another possibility is to control the frequency of the gated oscillator 74 so that its frequency decreases as the scanning beam proceeds from the top to the bottom of the frame. To still further improve the accuracy, in connection with the variable frequency oscillator 74, the horizontal scan count number could control the time delay of the delay circuit 72, to slightly decrease the delay with increasing horizontal scan count. Although these such arrangements could improve the accuracy of the system, they would complicate the circuitry and increase the cost of manufacture. For most intended uses, including the reading of chart, the additional accuracy is not deemed necessary.

Horizontal Scanning Detector

The horizontal scanning detector is generally designated by the reference numeral 90 in FIG. 2. The purpose of the horizontal scanning detector is to monitor the position of the scanning beam, and in particular the scanning number of the beam as it progresses from the top of the frame to the bottom of the frame. A first horizontal scan counter 92 is connected to the inhibit gate 68. A second horizontal scan counter 94 is connected to the first horizontal scan counter 92. The first horizontal scan counter 92 is a four-bit counter which counts 16 horizontal scan pulses and automatically resets itself to zero (count 16 is the same as count 0). The first horizontal scan counter 92 counts the pulses presented for counting when the inhibit gate 68 is enabled as described above. Thus, the gate 68 is enabled when the scan counter is less than 240 and only during the third frame. During this time the stepping motor is stationary and a sharp image builds up on the television camera 54 vidicon screen. The second horizontal scan counter 94, in combination with the first horizontal scan counter 92, continues the horizontal pulse count to a count of 240. Once the count of 240 has been reached, as evidenced by the corresponding inputs from the first and second horizontal scan counters to the inhibit gate 68, the inhibit gate 68 is inhibited from further transmitting horizontal pulses to the first horizontal scan counter 92 as well as the delay circuit 72.

The first horizontal scan counter 92 is connected to two encoders 96 and 98. The first encoder 96 is a zero scan count encoder. This encoder monitors the count of the first horizontal scan counter 92, and when the output of this binary counter contains the binary count 0000 (equivalent to decimal count 16) the encoder, 96 generates an output in binary digital form. In effect, the first horizontal scan counter 92 is utilized as a partial accumulator which transmits encoded information to the output shift register selector during every sixteenth horizontal scan. When the zero scan counter encoder 96 detects the binary count 0000 at the output of the first horizontal scan counter 92, it generates the number 32 in binary digital form as a six-bit word. The number 32 selected for this purpose is purely arbitrary and is not critical to the operation of the invention. It is required, however, that the computer be programmed to recognize the number 32 as signifying that sixteen horizontal pulses have been counted. The balance of the accumulation, i.e. accumulation of 16- counts until the count 240 is achieved, is performed in the computer.

The first horizontal scan counter 92 is also connected to a variable scan count encoder 98. This latter encoder also generates a binary digital word which is transmitted to the output shift register selector. However, the zero scan count encoder 96 generates the encoded number 32 regardless whether a video pulse has appeared to signify that a marking has been encountered by the scanning beam. After every 16 counts, regardless of any intervening video information, the number 32 is generated. On the other hand, the variable scan count encoder 98 can, on the occurrence of a video signal encode each of the counts of the first horizontal scan counter between the binary counts 0 and 15, for a total of 16 counts. When a video pulse appears, during a particular scan, the variable scan count encoder 98, in a similar way as the scan count in the first horizontal scan counter 92 is encoded into the number 32, encodes the respective scan count into binary digital form. For example, should a marking appear in a tenth scan after a 16 count, the number 10 is added to the number 32 to give a sum of 42, which is then encoded into a six-bit binary digital word. Whereas the output of the zero scan counter encoder 96 is transmitted to the output shift register selector only when 16 counts have been counted, the output of the variable scan count encoder 98 is transmitted to the output shift register selector immediately after the encoded output from the signal encoder 88 has been transmitted to the output shift register selector. As described above, the encoded information from the encoders 88, 96 and 98 must occur in a predetermined sequence in accordance with the manner in which the computer is programmed so that the computer can recognize the various 6-bit digital words as emanating from the appropriate encoders. For example, the number 32 in binary digital form, may appear separately if no markings appear between each 16 horizontal scanning counts. However, if after a 32 is generated by the encoder 96 and a video pulse appears during the fifth count of the counter 86, a six-bit binary word from the signal encooder 88, representing the count 5, would follow the number 32. Immediately thereafter, however, a six-bit binary digital word at the output of the variable scan count encoder 98 would appear to designate the particular horizontal scan count during which a marking appeared. If a video pulse is detected during a sixteenth scan, the number transmitted subsequent to the encoded word from the encoder 88 is the encoded number 32 from the zero scan count encoder 96. In such a case, the horizontal scan count from the first horizontal scan counter 92 is equal to zero, which added to the number 32 in the variable scan count encoder 98 is still equal to 32. The computer can be programmed to recognize, for example, that following a binary coded number between zero and 7, the next following number represents the scan count number during which the marking appeared.

Vertical Frame Detector

The vertical frame detector is generally designated by the reference numeral 100 in FIG. 2. A vertical pulse detector 102 is connected to the horizontal pulse generator 66. The output of the horizontal pulse generator includes vertical as well as horizontal pulses. At the beginning of each frame, as described above, a vertical pulse appears at the output of the horizontal pulse generator 66. This vertical pulse is detected by the vertical pulse detector 102. The output of the vertical pulse detector 102 comprises a pulse each time a vertical pulse appears at its input. The vertical pulse detector 102 is connected to the OR gate 40. As described above, the OR gate 40 can also be controlled by the start circuit 34. When an appropriate gating signal appears at the OR gate 40 from either of these two circuits, an output appears at the OR gate 40 which is supplied to the first and second horizontal scan counters 92 and 94 respectively, this output clearing these two counters and restoring them to zero count. Thus, the first and second horizontal scan counters are reset to a zero count when the start circuit is initiated manually or when a vertical pulse appears.

The vertical pulse detector 102 is also connected to a vertical pulse encoder 104. The vertical pulse encoder 104 generates an encoded word in binary digital form corresponding to the number 56 at each occurrence of a vertical pulse at the output of the vertical pulse detector 102. As in the case of the encoders 88 and 98, the encoded information at the output of the vertical pulse encoder 104 is immediately transmitted to the output shift register selector, as soon as a vertical pulse occurs. In this manner, the proper sequential flow of data to the computer is assured. In the case of the zero scan count encoder 96, as described above, the information is also immediately sent to the output shift register selector, but only on the occurrence of 16 scans, otherwise the information is stored within the first horizontal scan counter 92. As with the encoders 96 and 98, the encoded number 56 for the encoder 104 is selected purely arbitrarily and has no real significance other than the fact that the computer has been programmed to recognize the encoded number 56, in a binary digital form, as signifying that a vertical pulse has occurred. Since there are approximately 200 sectors 22, or effective frames which are analyzed, the vertical pulse number for each effective frame used is accumulated in the computer for analysis with the other encoded information.

Finally, the vertical pulse detector 102 is connected to a third frame detector 106. The third frame detector 106 counts the frames and generates output pulses to signify that a count of 3 has been reached for vertical pulses. The vertical signals are counted during stationary periods of the stepping motor 38. All sampling is done after the third vertical count. This, as described above, allows sufficient time for the scene to build up on the vidicon tube of the camera (which is a low cost and rather slow responding tube in the presently preferred embodiment). The third frame detector is connected to the start circuit 34. Pulses at the output of the third frame detector 106, occuring at the end of the third frame, again allows stepping of the motor. The third frame detector 106 is also connected to the gated oscillator 24, which gates the oscillator to allow it to oscillate only during the third frame period as described above. Finally, the third frame detector 106 is also connected to the inhibit gate 68 to thereby inhibit the passage of horizontal pulses through the inhibit gate except during the third frame as described above. For reasons already described, the third frame detector could be eliminated if a quickly responding vidicon tube is used. The third frame detector is utilized in the present circuit since the invention also contemplates the use of slow responding vidicon tubes which are typically found in less sophisticated television cameras. By including the third frame detector, it is assured that a sharp image appears on the vidicon tube, this increasing the resolution and accuracy of the system.

Computer Interface

Referring to FIG. 3, a block diagram is shown which represents an interface circuit according to the presently preferred embodiment. The interface circuit shown in FIG. 3 is merely illustrative, it not being critical the exact manner in which the encoded information is transmitted to the computer. Generally, the interface circuit consists of storage registers and transmit-receive circuitry. The interface circuitry is generally represented by the reference numeral 110. An output shift register selector is provided which has four inputs, one input being connected to the respective encoders 88, 96, 98 and 104. The encoded information is routed by the output shift register selector 112 to one of the shift registers 114 or 116. When an encoded piece of information appears at the output shift register selector 112, the shift pulse generator 118 connected to the output shift register selector 112, generates a shift pulse which is applied to the selected one of the shift registers 114 or 116 which permits the encoded information to enter the selected register. The clock pulses from the gated oscillator 74 shifts the selected shift register provided encoded information appears at the input to the output shift register selector 112. The shift register 114 and the shift register 116 are each connected to a filled register detector 120 which detects when one of these shift registers is filled and selects the other shift register for entry of new information along with shift pulses. The filled register detector 120 is also connected to the shift pulse generator 118 as well as the output shift register selector 112. A signal output from the filled register detector to these two latter circuits, enables gates in both which permits encoded information and shift pulses to enter the empty shift register.

An output shift generator 112 is connected to the shift registers 114 and 116. The output shift generator 122 applies two shift pulses to one of the selected shift registers in response to a ready signal from the computer (not shown). Such shift pulses to one of the selected registers are provided only when said register has been previously filled with encoded information. Four pairs of shift pulses in response to four ready signal for a total of eight shift pulses will be supplied, to transmit all the information to the output register 124 interfacing the computer. The filled register detector 120 is connected to the output shift generator 122 to control whether the shift pulses are applied to shift register 114 or the shift register 116.

A sync generator 126 is connected to the output shift generator 122. The output shift generator 122 notifies the sync generator 126 that two output shift pulsees have been supplied to one of the shift registers. These two shift pulses will have shifted 12 bits of encoded information into the output register 124 for transmission of a twelve-bit word to the computer. The output register 124 is also connected to the filled register detector 120, the latter controlling whether the output register 124 takes the data from the shift register 114 or from the shift register 116.

The sync signal at the output of the sync generator 126, which is generated in response to a ready signal from the computer, notifies the computer that the two shift pulses have been applied to one of the output shift registers and that a twelve-bit word has been assembled in the output register 124. This word can now be accepted by the computer when it is ready.

The shift pulses applied to one of the selected shift registers 114 or 116, transfers two six-bit words from said selected register to the output register. These two six-bit words are combined into a single twelve-bit word for transmission to the computer. In this way, the speed of transmission is doubled. The two six-bit binary digital words, for example, for the numbers 37 and 56, are later separated in the computer for the necessary operations. Subsequent to a generation of a sync pulse from the sync generator 126, a twelve-bit binary word in outputed to the computer in parallel at a maximum rate of about 500 KHz. The voltage levels at the output register 124 are compatible with computer requirements. Thus, the computer initiates the communication, with the interface circuit by generating a ready pulse. The ready pulse in turn generates shift pulses which shift the encoded information into the output register 124. When this is accomplished, a sync pulse is generated by the sync generator 126 to notify the computer that the encoded information is ready for transmission. The encoded information is subsequently transmitted from the output register 124 to the computer.

The interface circuit illustrated in FIG. 3, as suggested above, is not critical and other interface circuits can be utilized. The use of two shift registers 114 and 116 in the present embodiment is preferred so that the data arriving at the interface with a clock rate of the conversion unit can be transmitted at the rate required by the computer. The storage registers, in effect, accumulate the incoming data and the computer picks up that data at its own rate. The storage register must be large enough to store data, which may at times arrive at a faster rate than can be transmitted.

The presently preferred embodiment, converts the tachograph chart to digital form for input to a general purpose computer. In the present embodiment, the interface circuitry is designed for full compatibility with an IBM 1800 computer system. The present invention involves the method and circuitry relative to digital conversion, rather than the actual calculations to be performed by the computer.

Operation of the Conversion Unit

The operation of the tachograph digital conversion unit has been already described for the most part. Thus after mounting the chart 10 on the turntable 32, the start circuit 34 is initiated for positioning the chart to zero hour chart time. Subsequently, the chart is illuminated and the television camera 54, through the lens 32 begins to scan the magnified sector 24. However, the video information coming from the television camera 54 is not analyzed until after the third-frame detector has determined that the third frame has begun. By the beginning of the third frame, the illuminated stationary chart 10 has formed a sharp image on the television camera vidicon tube. The gated oscillator 74 is gated on after an initial time delay to correspond to the time when the scanning beam reaches the left boundary 24' of the magnified sector 24. The position of the marking, when encountered is correlated with the position of the scanning beam, which information is available from the encoders 88, 96, 98 and 104. The encoded information is transmitted to an interface circuit 110 which stores and transmits the encoded information to the computer for analysis.

To determine the speed of the vehicle, for example, the horizontal scan lines are counted. If a voltage pulse occurs during the sector shown in FIG. 1, the speed can then be measured by the horizontal scan count. With approximately 150 horizontal scan lines encompassing the speed range on the chart, the accuracy exceeds plus and minus 1%.

The markings on the chart will also generate output signals which appear as inputs to the computer. The numerals may not be continuous lines on the graph and the computer should be programmed to check such information as invalid. This will likewise be true for any stray markings, which should also be rejected. In addition, the slope of the graphs being monitored should be continuously calculated, to further discriminate against random markings intersecting the graph. At intersections, where there is a choice of two paths, the computer should select that path of continuous slope. This computer programming feature will be particularly helpful when a random signal or numeral intersects the graph twice and would otherwise be impossible to distinguish between the paths. Where such a decision is difficult, for instance at velocity peaks, the computer relies on the continuity check to reject stray information.

The graduations on the chart denoting velocity, RPM, distance, etc., can also be entered in the computer. The slope of these markings are always "zero" and will be recognized as such by the computer. The computer can utilize this information for interpretation between markings, to correct for any slight distortion of the lens system, for any initial misadjustment of the camera. In fact, use of these markings should eliminate the need for daily adjustment of the camera and lens system.

As previously indicated, the computer presently utilized with the present preferred embodiment is an IBM 1800 general purpose, medium size, computer. This computer has more than adequate memory storage capacity and computational power to deal with the digital conversion unit. However, computers having smaller memory capacity can be utilized, especially where not all the information obtained is to be retained. In all likelihood, the size of the memory required will be minimal, since much of the information accrued can be eliminated as the chart rotates through its cycle. Only significant information need be retained by the computer as it performs its calculations, such as excessive speed, current total distance, time, etc. Previous chart data can be discarded if it no longer enters into the computations. Sufficient memory must also be available to test for continuity and to discriminate against stray markings. The memory requirement is small however with reasonably careful physical handling of the charts.

With reduced capacity requirements as described above, it may be possible to utilize a mini computer, such as the IBM SYSTEM VII or the DIGITAL EQUIPMENT PDP* SERIES. Of course, the IBM 360 could likewise be utilized. Another possibility, requiring the least capital investment, is to write the chart data, obtained at the output of the encoders 88, 96, 98 and 104, sequentially on magnetic tape for later processing at a computer service bureau.

It will be understood that each of the elements described above, or two or more together, may also find a useful application in other types of digital conversion units differing from the types described above.

While the invention has been illustrated and described as embodied in an apparatus for converting markings derived from a graph, particularly a tachograph, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended:

1. An apparatus for converting the information on a chart marked with a vehicle trip-recorder graph into suitable form for analysis by a computer, said apparatus comprising scanning means for scanning successive areas of at least a portion of the vehicle trip-recorder graph with a scanning beam; first generating means for generating a first signal when said scanning beam encounters a marking on the area being scanned; second generating means for generating a second signal corresponding to the position of said scanning beam when said beam encounters a marking on the area being scanned; and means for registering the information represented by said first and second signals, wherein the trip-recorder graph is a graph of the magnitude of at least one vehicle trip variable plotted with respect to time, and wherein said apparatus comprises means for positioning the graph stationarily with respect to said scanning means during the scanning of the graph with such an orientation that during the tracing of at least some scanning lines said scanning beam intersects said graph a plurality of times, and wherein said first generating means comprises means for generating a plurality of first signals respectively corresponding to the plurality of times said scanning beam intersects the graph during the tracing of a single scan line, and wherein said second generating means comprises means for generating a plurality of second signals respectively corresponding to the plurality of times said scanning beam intersects said graph during the tracing of a single scan line, and wherein said means for registering comprises means for registering said plurality of first signals and said plurality of second signals when said scanning beam intersects said graph a plurality of times during the tracing of a single scan line.

2. An apparatus as defined in claim 1, wherein the trip-recorder graph is a graph of the magnitude of at least one vehicle trip variable plotted with respect to time, with time being measured along a predetermined direction on said graph, and wherein said apparatus comprises means for supporting said graph and for effecting relative movement between the graph and said scanning means along said predetermined direction to bring successive portions of said graph into the scanning area of said scanning means.

3. An apparatus as defined in claim 1, wherein the trip-recorder graph is a graph of the magnitude of at least one vehicle trip variable plotted with respect to time, with time being plotted on the graph along a first direction and with the magnitude of the vehicle trip variable being plotted on the graph along a second direction perpendicular to said first direction, and wherein said apparatus comprises means for supporting said graph and for effecting relative movement between the graph and said scanning means along said first direction to bring successive portions of said graph into the scanning area of said scanning means.

4. An apparatus as defined in claim 1; and further comprising transmitting means for transmitting the information represented by said first and second signals to a computer for analysis.

5. An apparatus as defined in claim 4, wherein said scanning means comprises a television camera focused at least on a portion of said graph, said camera having, while scanning said portion, a composite electrical signal output which includes information regarding the instantaneous position of said scanning beam and also includes video information regarding the presence and the absence of markings on said portion.

6. An apparatus as defined in claim 5, further comprising a video amplifier connected to said television camera and to said first generating means for amplifying said video information and generating a signal pulse for transmission to said first generating means when said scanning beam encounters a marking.

7. An apparatus as defined in claim 5, further comprising a synchronization pulse separator connected to said television camera for separating said video information from the scanning beam position information contained in said composite signal output, said video information being transmitted to said first generating means and said scanning beam position information being transmitted to said second generating means, said television camera scanning said portion in a predetermined number of scans comprising at least a portion of a frame, said scanning beam position information containing horizontal pulses at the beginning of each beam scan and vertical pulses at the beginning of each frame.

8. An apparatus as defined in claim 7, wherein said first generating means comprises a signal gate connected to said pulse generator, said gate generating a signal pulse only when video information appears at said pulse separator, said signal pulse comprising said first signal.

9. An apparatus as defined in claim 7, wherein said second generating means comprises a resettable scan counter connected to said pulse separator for counting said horizontal pulses between successive vertical pulses, said scan counter generating a scan position pulse when video information appears during the respective scan.

10. An apparatus as defined in claim 4, further comprising signal converters connected in said first and second generating means for generating said first and second signals in a predetermined form suitable for processing by a computer.

11. An apparatus as defined in claim 10, wherein said converters are encoders for converting said first and second signals into digital form suitable for a digital computer.

12. An apparatus as defined in claim 4, further comprising magnification means interposed between said graph and said scanning means for changing the scale of said graph prior to scanning.

13. An apparatus as defined in claim 12, wherein said magnification means comprises a lens for magnifying said portion in at least one direction, whereby said scanning means scans said magnified portion to thereby increase the resolution of said apparatus.

14. An apparatus as defined in claim 1, wherein the trip-recorder graph is a graph of the magnitude of at least one vehicle trip variable plotted with respect to time, with time being measured along a predetermined first direction on said graph and with the magnitude of said variable being plotted along a second direction transverse to said first direction, and wherein said apparatus comprises supporting means for supporting the chart and for effecting relative movement between the graph and said scanning means along said first direction to bring successive portions of said graph into the scanning area of said scanning means, and wherein said apparatus further comprises magnifying means positioned between said scanning means and the location at which said chart is held by said supporting means and operative for magnifying said graph to a greater extent along said first direction than along said second direction so as to effect enlargement of the time scale without similarly effecting enlargement of the graph with respect to the magnitude of said vehicle trip variable.

15. An apparatus as defined in claim 14, wherein said magnifying means comprises a magnifying lens capable of magnifying only in one direction.

16. An apparatus as defined in claim 15, wherein said magnifying lens is a cylindrical lens.

17. An apparatus as defined in claim 4, wherein said transmitting means comprises an output storage means for storing said first and second signals until said computer is ready to accept the same.

18. An apparatus as defined in claim 17, further comprising first and second standby registers for storing said first and second signals; an output shift register selector connected to said standby registers for routing said first and second signals into one of said standby registers until it becomes filled; and a filled register detector for sensing when one of said standby detectors becomes filled and causing said output shift register selector to route said first and second signals to the other of said standby registers.

19. An apparatus as defined in claim 18, wherein said output storage means is an output register connected to each of said standby registers; further comprising a shift pulse generator connected to each of said standby registers; and an output shift generator arranged for connection to the computer for initiating said shift pulse generator in response to a ready signal from the computer, said shift pulse generator generating shift pulses which transfer the information stored in a respective filled standby register to said output register.

20. An apparatus as defined in claim 19, further comprising a sync generator for generating a sync pulse for the computer to signify that said output register is filled with information which can be transmitted to the computer.

21. An apparatus for converting markings derived from a graph, particularly a techograph chart, into suitable form for analysis by a computer, said apparatus comprising scanning means for scanning successive areas of at least a portion of said graph with a scanning beam; first generating means for generating a first signal when said scanning beam encounters a marking on the area being scanned; second generating means for generating a second signal corresponding to the position of said scanning beam when said beam encounters a marking on the area being scanned; means for registering when said first signal is generated the information represented by said second signal, said scanning means comprising a pulse being applied to said gate for inhibiting the television camera focused at least on a portion of said graph, said camera having, while scanning said portion, a composite electrical signal output which includes information regarding the instantaneous position of said scanning beam and also includes video information regarding the presence of markings on said portion, further comprising a synchronization pulse separator connected to said television camera for separating said video information from the scanning beam position information contained in said composite signal output, said video information being transmitted to said first generating means and said scanning beam position information being transmitted to said second generating means, said television camera scanning said portion in a predetermined number of scans comprising at least a portion of a frame, said scanning beam position information containing horizontal pulses at the beginning of each beam scan and vertical pulses at the beginning of each frame, said first generating means comprising a signal gate connected to said pulse separator and operative for generating a signal pulse only when video information appears at said pulse separator, said signal pulse constituting said first signal, further comprising a delay circuit connected to said signal gate and to pulse separator and responsive to said horizontal pulses, the delay circuit generating a gating pulse, when a horizontal pulse appears, having a duration corresponding to the time said scanning beam takes to reach said portion on said graph, said gating pulse being applied to said gate for inhibiting the generation of first signals prior to said scanning beam reaching said portion.

22. An apparatus for converting markings derived from a graph, particularly a tachograph chart, into suitable form for analysis by a computer, said apparatus comprising scanning means for scanning successive areas of at least a portion of said graph with a scanning beam; first generating means for generating a first signal when said scanning beam encounters a marking on the area being scanned; second generating means for generating a second signal corresponding to the position of said scanning beam when said beam encounters a marking on the area being scanned; means for registering when said first signal is generated the information represented by said second signal, said scanning means comprising a television camera focused at least on a portion of said graph, said camera having, while scanning said portion, a composite electrical signal output which includes information regarding the instantaneous position of said scanning beam and also includes video information regarding the presence of markings on said portion, further comprising a synchronization pulse separator connected to said television camera for separating said video information from the scanning beam position information contained in said composite signal output, said video information being transmitted to compator, said apparatus comprising scanning means for said first generating means and said scanning beam position information being transmitted to said second generating means, said television camera scanning said portion in a predetermined number of scans comprising at least a portion of a frame, said scanning beam position information containing horizontal pulses at the beginning of each beam scan and vertical pulses at the beginning of each frame, said first generating means comprises a signal gate connected to said pulse separator and operative for generating a signal pulse only when video information appears at said pulse separator, said signal pulse constituting said first signal, further comprising a delay circuit connected to said pulse separator responsive to said horizontal pulses, the delay circuit generating a gating pulse, at the appearance of a horizontal pulse, having a duration corresponding to the time said scanning beam takes to reach said portion on said graph, and a gated oscillator generating clock pulses at a predetermined frequency to generate a predetermined number of clock pulses while said scanning beams scans said portion and responsive to said gating pulse to oscillate only at the end of said gating pulse once said scanning beam has reached said portion.

23. An apparatus as defined in claim 22, wherein said first generating means comprises a signal gate connected to said pulse separator and to said gated oscillator, said gate permitting the passage of said clock pulses only when video information appears at said pulse separator, said first signal being the pulse passing through said signal gate.

24. An apparatus as defined in claim 23, wherein said second generating means further comprises a clock pulse counter connected to said gated oscillator for counting the clock pulses while said scanning beam scans said portion, said clock pulse counter generating a clock number signal when video information appears, said clock number signal forming part of said second signal.

25. An apparatus for converting markings derived from a graph, particularly a tachograph chart, into suitable form for analysis by a computer, said apparatus comprising scanning means for scanning successive areas of at least a portion of said graph with a scanning beam; first generating means for generating a first signal when said scanning beam encounters a marking on the area being scanned; second generating means for generating a second signal corresponding to the position of said scanning beam when said beam encounters a marking on the area being scanned; means for registering when said first signal is generated the information represented by said second signal, said scanning means comprising a television camera focused at least on a portion of said graph, said camera having, while scanning said portion, a composite electrical signal output which includes information regarding the instantaneous position of said scanning beam and also includes video information regarding the presence of markings on said portion, further comprising a synchronization pulse separator connected to said television camera for separating said video information from the scanning beam position information contained in said composite signal output, said video information being transmitted to said first generating means and said scanning beam position information being transmitted to said second generating means, said television camera scanning said portion in a predetermined number of scans comprising at least a portion of a frame, said scanning beam position information containing horizontal pulses at the beginning of each beam scan and vertical pulses at the beginning of each frame, said first generating means comprising a signal gate connected to said pulse separator and operative for generating a signal pulse only when video information appears at said pulse separator, said signal pulse constituting said first signal, and wherein said second generating means comprises a resettable scan counter connected to said pulse separator for counting said horizontal pulses between successive vertical pulses, said scan counter comprising means for generating a scan position pulse when video information appears during the respective scan, and wherein said scan counter includes means for repeatedly counting a predetermined number of horizontal pulses between successive vertical pulses, said scan counter comprising means for generating another scan position pulse at regular intervals corresponding to said predetermined number of irrespective of the appearance of video information, said one and said other scan position pulses being components of said second signal.

26. An apparatus as defined in claim 25, wherein said second generating means further comprises a vertical pulse detector connected to said pulse separator, said vertical pulse detector generating a frame number pulse when a vertical pulse appears at said pulse separator, said second signal further including said frame position pulse.

27. An apparatus as defined in claim 26, wherein said graph comprises a plurality of successive portions, further comprising moving means for moving said successive portions into spaced relation with said television camera for being scanned thereby, the movement of successive portions taking place after the occurrence of a predetermined number of vertical pulses at said pulse separator.

28. An apparatus as defined in claim 27, further comprising a nth frame detector connected to said vertical pulse detector for generating nth frame pulses every nth successive frame, said nth frame pulses being applied to said moving means to thereby move successive portions in relation to said television camera for scanning thereby.

29. An apparatus as defined in claim 28, wherein said first generating means includes gate means connected to said nth frame detector, said first generating means being capable of generating first signals only during successive nth frames to thereby improve the resolution of said television camera by assuring that said portion has formed a sharp image in said television camera.

30. An apparatus for converting the information on a chart marked with a vehicle trip-recorder graph into suitable form for analysis by a computer, said apparatus comprising scanning means for scanning successive areas of at least a portion of the vehicle trip-recorder graph with a scanning beam; first generating means for generating a first signal when said scanning beam encounters a marking on the area being scanned; second generating means for generating a second signal corresponding to the position of said scanning beam when said beam encounters a marking on the area being scanned; and means for registering the information represented by said first and second signals, wherein the trip-recorder graph is a polar-coordinate graph, and wherein said apparatus comprises means for supporting said chart and for effecting relative movement between the chart and said scanning means in a sense bringing circumferentially successive portions of said graph into the scanning area of said scanning means.

31. An apparatus for converting the information on a chart marked with a vehicle trip-recorder graph into suitable form for analysis by a computer, said apparatus comprising scanning means for scanning successive areas of at least a portion of the vehicle trip-recorder graph with a scanning beam; first generating means for generating a first signal when said scanning beam encounters a marking on the area being scanned; second generating means for generating a second signal corresponding to the position of said scanning beam when said beam encounters a marking on the area being scanned; and means for registering the information represented by said first and second signals, and wherein the trip-recorder graph is a polar-coordinate graph of the magnitude of at least one vehicle trip variable plotted with respect to time, with the being plotted on the graph along the circumferential direction and with the magnitude of the vehicle trip variable being plotted on the graph along the radial direction, and wherein said apparatus comprises means for positioning the graph stationarily with respect to said scanning means during scanning of the graph with such an orientation that the scan lines traced by said scanning beam are tangential to the circumferential direction.

32. An apparatus as defined in claim 31, wherein said apparatus further comprises moving means for effecting relative movement between the graph and said scanning means in a sense bringing circumferentially successive portions of said graph into the scanning area of said scanning means.

33. A method for converting the information on a chart marked with a vehicle trip-recorder graph into suitable form for analysis by a computer, said method comprising the steps of scanning successive areas of at least a portion of the vehicle trip-recorder graph with a scanning beam; generating a signal indicative of the position of the scanning beam when the scanning beam encounters a marking on the area being scanned; and registering said signal, wherein the trip-recorder graph is a polar-coordinate graph, and wherein said step of scanning comprises effecting relative movement between the chart and a scanning means in a sense bringing circumferentially successive portions of said polar-coordinate graph into the scanning area of the scanning means.

34. A method as defined in claim 33, wherein the trip-recorder graph is a polar-coordinate graph of the magnitude of at least one vehicle trip variable plotted with respect to time, with time being plotted on the graph along the circumferential direction and with the magnitude of the vehicle trip variable being plotted on the graph along the radial direction, and wherein said step of scanning comprises maintaining the graph stationary with respect to a scanning arrangement during scanning of the graph with such an orientation that the scan lines traced by the scanning beam are tangential to the circumferential direction.

35. A method as defined in claim 34, wherein said step of scanning further comprises effecting relative movement between the graph and the scanning arrangement in a sense bringing circumferentially successive portions of the graph into the scanning area of the scanning means.

36. A method for converting the information on a chart marked with a vehicle trip-recorder graph into suitable form for analysis by a computer, said method comprising the steps of scanning successive areas of at least a portion of the vehicle trip-recorder graph with a scanning beam; generating a signal indicative of the position of the scanning beam when the scanning beam encounters a marking on the area being scanned; and registering said signal, wherein said step of scanning comprises moving successive portions of the trip-recorder graph into the scanning area of a scanning arrangement having a scanning beam, and wherein said step of generating a signal comprises generating a signal indicative of the position of the scanning beam in response to an encounter by the beam of a marking on the area being scanned but only when the scanning beam is located within a predetermined are a smaller than the scanning area of the scanning arrangement.

37. A method as defined in claim 36, wherein said step of generating a signal comprises generating counting pulses at a predetermined frequency during the time the scanning beam is located within said predetermined area smaller than said scanning area of the scanning arrangement, and counting the counting pulses to determine the position of the scanning beam by determining the number of counting pulses generated during the tracing of a scan line by said beam within said predetermined area.

38. A method of converting the information on a chart marked with a vehicle trip-recorder graph into suitable form for analysis by a computer, wherein the trip-recorder graph is a graph of the magnitude of at least one vehicle trip variable plotted with respect to time, said method comprising the steps of scanning successive areas of at least a portion of the vehicle trip-recorder graph with a scanning beam, including positioning the graph stationarily with respect to the source of the scanning beam during the scanning of each successive area and with such an orientation that during the tracing of at least some scanning lines the scanning beam intersects the graph a plurality of times during the tracing of a single scanning line; generating a first signal when the scanning beam encounters a marking on the area being scanned and, when the scanning beam intersects the graph a plurality of times during the tracing of a single scanning line, generating a plurality of corresponding first signals; generating a second signal corresponding to the position of the scanning beam when the beam encounters a marking on the area being scanned and, when the scanning beam intersects the graph a plurality of times during the tracing of a single scanning line, generating a plurality of corresponding second signals; and registering said first and second signals and, when the scanning beam intersects the graph a plurality of times during the tracing of a single scanning line, registering the corresponding plurality of first signals and the corresponding plurality of second signals.

39. A method as defined in claim 38, with time being measured along a predetermined direction on said graph, and wherein said step of scanning comprises effecting relative movement between the graph and a scanning means along said predetermined direction to bring successive portions of the graph into the scanning area of the scanning means.

40. A method as defined in claim 38, with time being plotted on the graph along a first direction and with the magnitude of the vehicle trip variable being plotted on the graph along a second direction perpendicular to the first direction, and wherein said step of scanning comprises effecting relative movement between the graph and a scanning arrangement along said first direction to being successive portions of the graph into the scanning area of the scanning arrangement.

41. A method as defined in claim 38, with time being measured along a predetermined first direction on said graph and with the magnitude of said variable being plotted along a second direction transverse to said first direction, and wherein said step of scanning comprises effecting relative movement between the graph and a scanning arrangement along said first direction to bring successive portions of the graph into the scanning area of the scanning arrangement, and magnifying the image of the graph presented to the scanning direction to a greater extent along said first direction than along said second direction so as to effect enlargement of the time scale without similarly effecting enlargement of the graph with respect to the magnitude of said vehicle trip variable.

42. A method as defined in claim 41, wherein the step of magnifying comprises magnifying the image presented to the scanning arrangement in one direction only.

43. A method as defined in claim 41, wherein the step of magnifying comprises positioning a cylindrical lens intermediate the graph and the scanning arrangement.

44. An apparatus for converting the information on a chart marked with a vehicle trip-recorder graph into suitable form for analysis by a computer, said apparatus comprising scanning means for scanning successive areas of at least a portion of the vehicle trip-recorder graph with a scanning beam; first generating means for generating a first signal when said scanning beam encounters a marking on the area being scanned; second generating means for generating a second signal corresponding to the position of said scanning beam when said beam encounters a marking on the area being scanned; and means for registering the information represented by said first and second signals, wherein the trip-recorder graph is a graph of the magnitude of at least one vehicle trip variable plotted with respect to time, with time being measured along a predetermined first direction on said graph and with the magnitude of said variable being plotted along a second direction transverse to said first direction, and wherein said apparatus comprises supporting means for supporting the chart and for effecting relative movement between the graph and said scanning means along said first direction to bring successive portions of said graph into the scanning area of said scanning means, and wherein said apparatus further comprises magnifying means positioned between said scanning means and the location at which said chart is held by said supporting means and operative for magnifying said graph to a greater extent along said first direction than along said second direction so as to effect enlargement of the time scale without similarly effecting enlargement of the graph with respect to the magnitude of said vehicle trip variable, wherein said graph is a polar-coordinate graph, and wherein said first and second directions are respectively the circumferential and radial directions of the polar-coordinate graph, and wherein said supporting means is operative for rotating circumferentially successive portions of said graph into the scanning area of said scanning means, and wherein said magnifying means is a lens capable of magnifying in only one direction and oriented so that such one direction is perpendicular to the radial direction on said polar-coordinate graph.

45. A method for converting the information on a chart marked with a vehicle trip-recorder graph into suitable form for analysis by a computer, said method comprising the steps of scanning successive areas of at least a portion of the vehicle trip-recorder graph with a scanning beam; generating a signal indicative of the position of the scanning beam when the scanning beam encounters a marking on the area being scanned; and registering said signal, wherein the trip-recorder graph is a graph of the magnitude of at least one vehicle trip variable plotted with respect to time, with time being measured along a predetermined first direction on said graph and with the magnitude of said variable being plotted along a second direction transverse to said first direction, and wherein said step of scanning comprises effecting relative movement between the graph and a scanning arrangement along said first direction to being successive portions of the graph into the scanning area of the scanning arrangement, and magnifying the image of the graph presented to the scanning arrangement to a greater extent along said first direction than along said second direction so as to effect enlargement of the time scale without similarly effecting enlargement of the graph with respect to the magnitude of said vehicle trip variable, wherein said graph is a polar-coordinate graph, and wherein said first and second directions are respectively the circumferential and radial directions of the polar-coordinate graph, and wherein said step of scanning comprises rotating circumferentially successive portions of said graph into the scanning area of the scanning arrangement, and further comprises magnifying the image of said graph presented to the scanning arrangement in a direction perpendicular to a radius of said polar-coordinate graph.

* * * * *